United States Patent
Garcia et al.

(10) Patent No.: US 10,536,610 B2
(45) Date of Patent: Jan. 14, 2020

(54) REPAIRING A PRINTED IMAGE

(71) Applicant: Hewlett-Packard Development Company, L.P., Houston, TX (US)

(72) Inventors: Luis Garcia, Sant Cugat del Valles (ES); Alex Andrea, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/748,558

(22) PCT Filed: Oct. 30, 2015

(86) PCT No.: PCT/EP2015/002173
§ 371 (c)(1),
(2) Date: Jan. 29, 2018

(87) PCT Pub. No.: WO2017/071723
PCT Pub. Date: May 4, 2017

(65) Prior Publication Data
US 2018/0220040 A1    Aug. 2, 2018

(51) Int. Cl.
H04N 1/403    (2006.01)
H04N 1/409    (2006.01)

(52) U.S. Cl.
CPC .................. *H04N 1/4097* (2013.01)

(58) Field of Classification Search
None
See application file for complete search history.

(56) References Cited

U.S. PATENT DOCUMENTS

| 6,812,997 | B2 | 11/2004 | Kaltenbach et al. |
| 8,077,350 | B1 * | 12/2011 | Simmons ................. H04N 1/54 |
| | | | 358/1.9 |
| 8,405,843 | B2 | 3/2013 | Oi et al. |
| 2008/0238995 | A1 * | 10/2008 | Menendez ................. B41J 3/28 |
| | | | 347/37 |
| 2009/0033970 | A1 | 2/2009 | Bray et al. |

(Continued)

FOREIGN PATENT DOCUMENTS

| WO | 2013065034 | 5/2013 |
| WO | 2014117839 | 8/2014 |
| WO | 2015094206 | 6/2015 |

OTHER PUBLICATIONS

International Searching Authority, "Search Report," issued in connection with PCT Patent Application No. PCT/EP2015/002173, dated Nov. 2, 2016, 6 pages.

(Continued)

*Primary Examiner* — Henok Shiferaw
(74) *Attorney, Agent, or Firm* — HP Inc. Patent Department

(57) ABSTRACT

A method is described in which a printed image which has been printed by a printer based on a printing template is repaired. A damaged area of the printed image is identified and a reprinting segment on the printed image is determined such as to overlap the identified damaged area. With the printer a layer of printing fluid is printed over the damaged image and a correction printing template is printed. The correction printing template includes a segment of the printing template that corresponds to the reprinting segment of the printed image.

16 Claims, 7 Drawing Sheets

(56) References Cited

U.S. PATENT DOCUMENTS

2014/0204426 A1* 7/2014 Levi .................. H04N 1/00005
358/3.26
2014/0270397 A1* 9/2014 Sochi ..................... G06T 7/001
382/112

OTHER PUBLICATIONS

International Searching Authority, "Written Opinion," issued in connection with PCT Patent Application No. PCT/EP2015/002173, dated Nov. 2, 2016, 6 pages.
No Naked Walls, "Photo Restoration Services," retrieved from the internet [www.nonakedwalls.com/products-and-services/restoration-services/] on Jul. 28, 2015, 11 pages.
No Naked Walls!, "Photo Restoration Services—fix and reprint damaged and faded pictures," Sep. 18, 2013, retrieved from the internet [http://nonakedwalls.com/products-and-services/restoration-services/ ] on Jul. 28, 2015, 11 pages.

* cited by examiner

REPAIRING A PRINTED IMAGE

RELATED APPLICATION

This patent arises from the U.S. national stage of International Patent Application Serial No. PCT/EP2015/002173, having an international filing date of Oct. 30, 2015.

BACKGROUND

In the course of printing an image, areas of the image may get damaged, e.g. when a print head of the printer gets in contact with the print substrate while printing. Thus, it may be the case to reprint the whole printout.

BRIEF DESCRIPTION OF THE DRAWINGS

Examples will be described, by way of example only, with reference to the accompanying drawings in which corresponding reference numerals indicate corresponding parts and in which.

DETAILED DESCRIPTION

Accuracy of printed images may depend, amongst other things, on printing technology used in a printer. In particular, mechanical imprecision of the printer's components may cause image defects. Images including defects might e.g. become impossible to sell. However, printing an additional image may need extra time and thus increase costs due to the extra printing fluid and extra substrate.

Thus, a method is provided for repairing a printed image which has been printed by a printer based on an printing template, wherein repairing comprises identifying a damaged area of the printed image, determining a reprinting segment on the printed image such as to overlap the identified damaged area, printing a layer of printing fluid over the damaged area, and printing a correction printing template. Further, a printer for applying the method and a computer-readable medium for storing a program causing a computer processor to perform the method are provided. Hence, by reprinting only the damaged areas reprinting the whole image can be avoided which in turn may save time and ink. Further, when printing on a rigid substrate, reusing the substrate, which may be a big contributor to the cost per copy, may save money.

Figure 1:
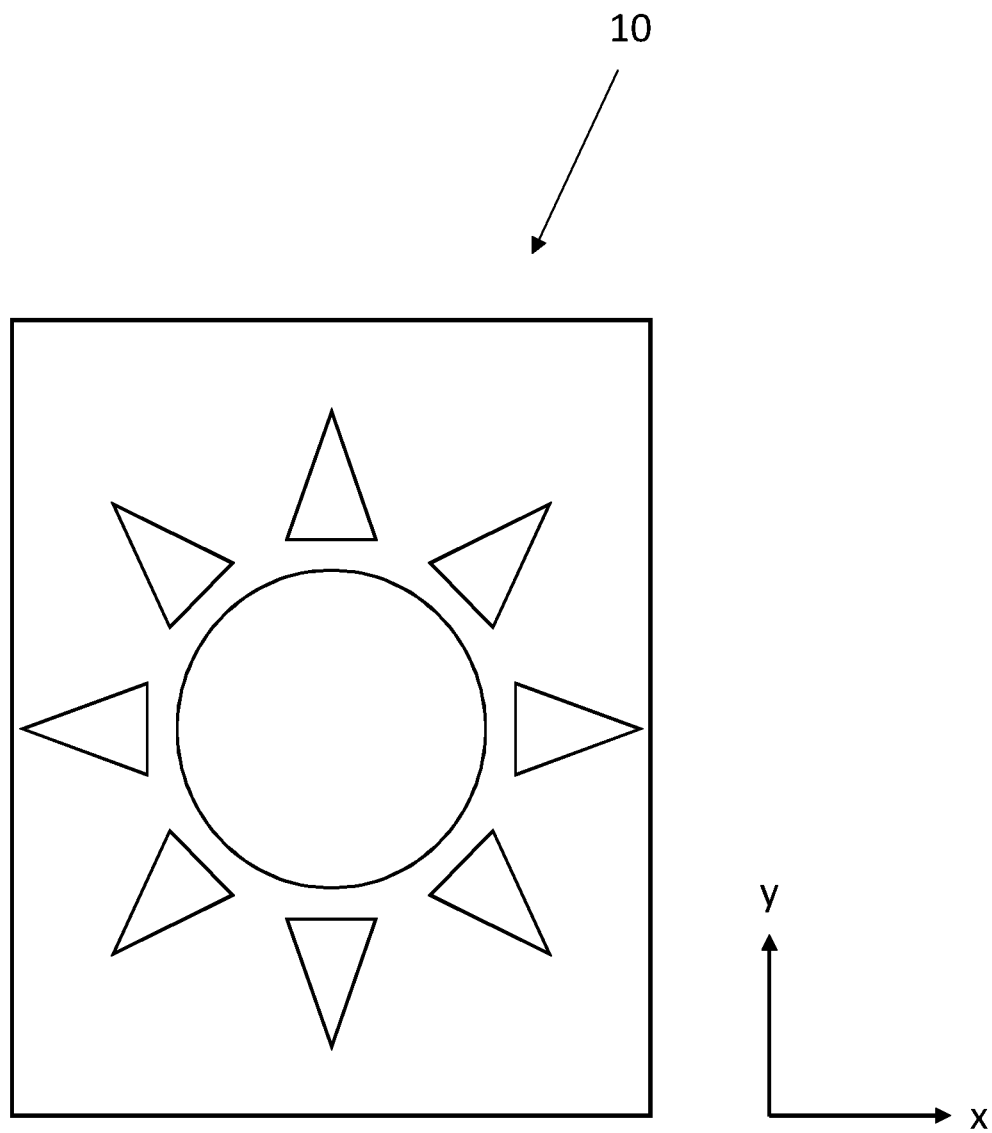
FIG. 1 is a schematic plan view of an example printing template.

FIG. 1 illustrates an example printing template 10. In some examples, the printing template 10 may be a data file such as an image data file, text data file or a PDF-file including any text, graphics and/or pictures. Thus, FIG. 1 visualizes the image data content of the example printing template 10. Visualization of image data content may be done e.g. by a computer using an image viewing software. A printer (not shown in FIG. 1) may be used to print the image data content of the printing template 10. A print software may be used to configure e.g. the printing size, orientation, and/or quality of the printing template 10 which is to be printed. In particular, printing size of the printing template 10 may be adapted to correspond with the size of the substrate on which the printing template 10 is to be printed.

For the sake of a more comprehensive description, non-restrictive coordinate axes in x-direction and y-direction are added to FIG. 1 (and FIGS. 2 to 5). In general, the file size of an image is the digital image file size e.g. in kilobytes or megabytes. The file size may be proportional to the pixel dimensions. Correspondingly, the printing template 10 may be described by using pixel dimensions that specify width and height of an image in pixels. The resolution of the printing template 10 may refer to the fineness of detail in a printing template image data file. In general, it can be said that the more pixels per inch, the higher the resolution of an image. Herein, the term "dimension" regarding the printing template 10 is to be understood as the printing size of the printing template 10 extending in x-direction and y-direction on a printing substrate.

Figure 2:
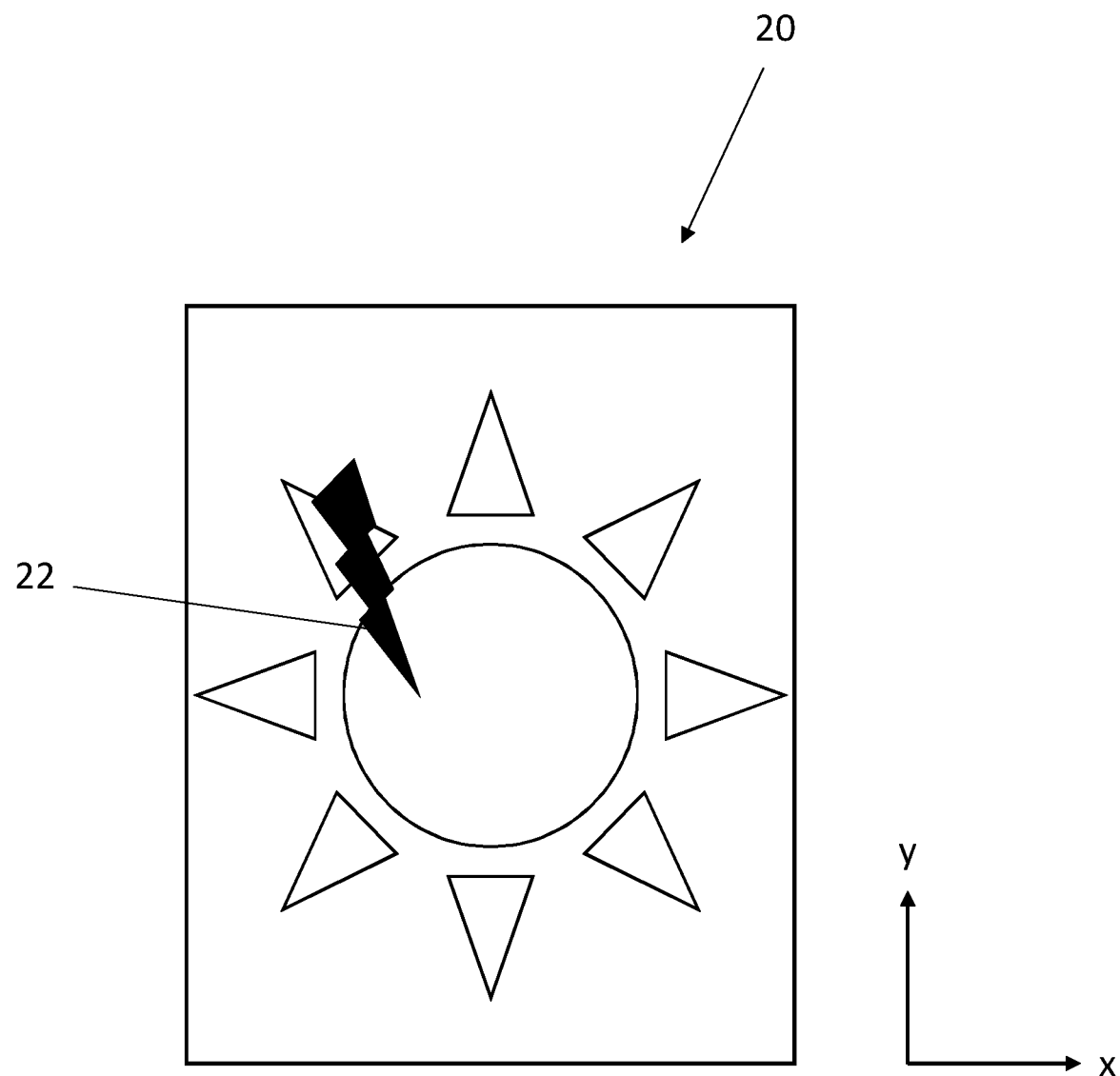
FIG. 2 is a schematic plan view of an example printed image having a damaged area.

Now referring to FIG. 2, which illustrates an example printed image 20 having a damaged area 22. The printed image 20 extends in x-direction and y-direction. The x-direction may also be referred to the width of the printed image 20, and the y-direction may also be referred to the length of the printed image 20.

The printed image 20 has been printed by a printer based on a printing template 10. In some examples, the printed image 20 represents an image, a text, a graphic or others. The printed image 20 has been printed by a printer on a substrate or media. In some examples, the substrate on which the printing template 10 is printed is a rigid medium. Rigid substrates may include glass, stones, plastics or other materials. In some examples, the printing template 10 is printed on flexible media. Flexible media may include paper. In some examples, the form of the substrate can be rectangular, quadratic or can take any desired form based on the configuration of the printing template 10.

The printed image 20 may include a damaged area 22. In some examples, the damaged area 22 is a local defect in a specific area of the printed image 20. In some examples, the damaged area 22 is a part of the printed image 20 that has been damaged during a printing cycle, a post processing cycle or an exhibiting cycle. In some examples, a print head of the printer may contact, during the printing process, the substrate on which the printing template 10 is printed. Thereby, the printing fluid from nozzles and/or a nozzle plate may be transferred and thereby staining the substrate and ruining or damaging areas on the printed image 20.

In some examples, the damaged area 22 of the printed image 20 may be identified by a printer operator by visually comparing the printed image 20 with the printing template 10. Visually comparing may refer to the printer operator checking whether the image content of the printed image 20 is identical with the image content of the printing template 10. In some examples, the damaged area 22 may be identified by a printer operator on a computer using the original image data file, i.e. the printing template 10.

The printer may include a digital frond end (DFE) that may support the print process. The DFE may further comprise a kind of server that controls the print workflow. In general, for digital printing, a printing template image data file is submitted to the print system through the DFE for further processing and printing. In some examples, the DFE may be used to convert the printing template image data file through a series of image processing applications such as trapping, segmentation, rasterization, color management and image resolution enhancement to a form that is optimized for a particular printing system. In some examples, the identification of the damaged area 22 can be done by the printer operator by means of the DFE included in the printer. In some examples, the damaged area 22 may be identified automatically, i.e., the printed image 20 may be reloaded into the printer and a comparison between the reloaded printed image 20 and the printing template 10 is processed without human assistance. In some examples, the damaged area 22 may be identified automatically by the DFE included in the printer.

Figure 3:
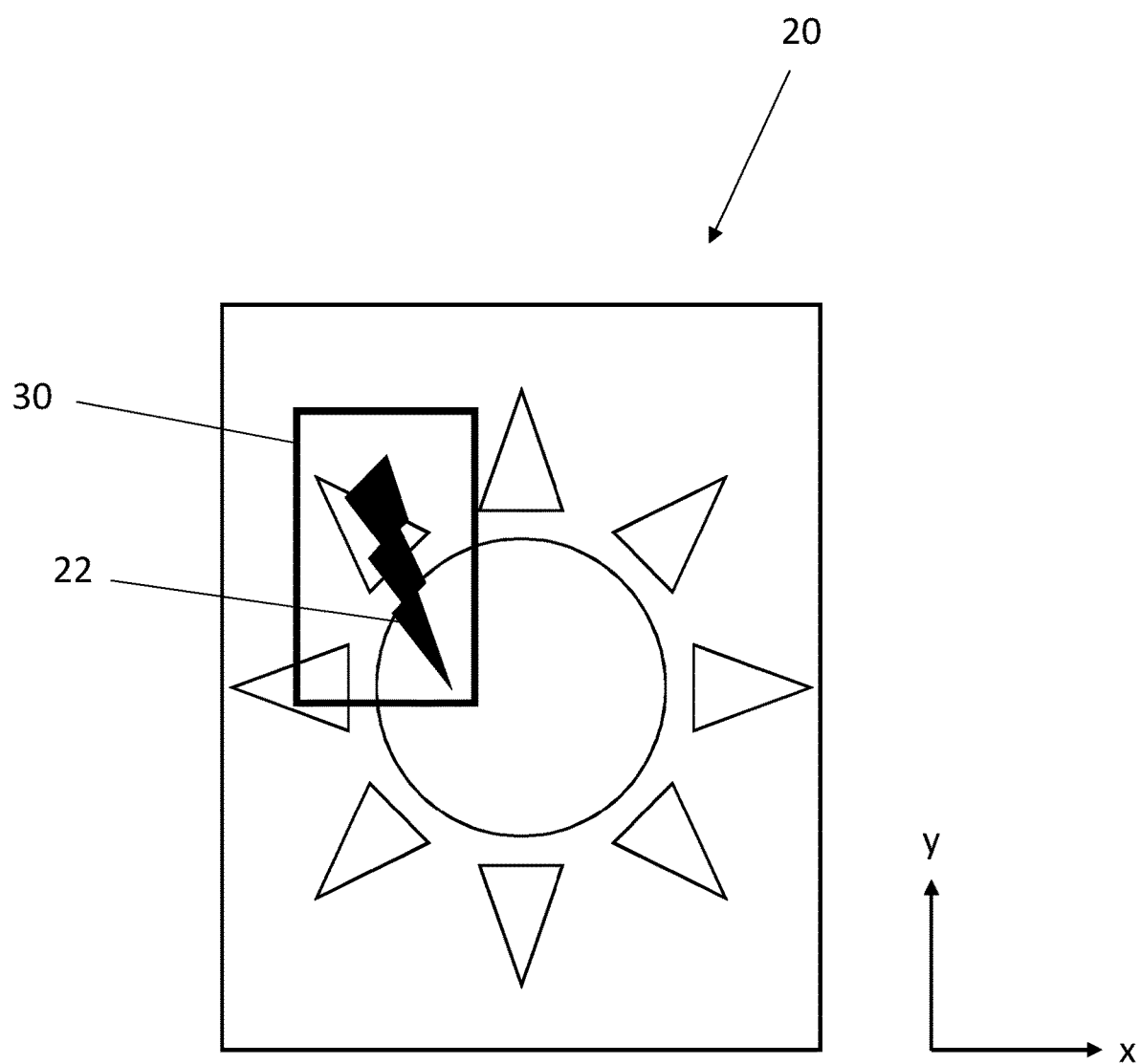
FIG. 3 is a schematic plan view of the example printed image including a reprinting segment.

Now referring to FIG. 3, which illustrates an example printed image 20 including a reprinting segment 30. The reprinting segment 30 may be understood as a segment of the printed image 20 that defines which part of the printed image 20 is to be repaired by the repairing process according to the present invention.

In some examples, the reprinting segment 30 is a segment on the printed image 20 that may be manually determined by a printer operator. In some examples, the reprinting segment 30 is determined by using image processing software on the printer or on an external computing device. The reprinting segment 30 may be dimensioned to overlap the identified damaged area 22. In some examples, the reprinting segment 30 may include one damaged area 22 on the printed image 20, i.e. the reprinting segment 30 is dimensioned to overlap the one identified damaged area 22. In some examples, when the printed image 20 includes a plurality of damaged areas 22, a plurality of reprinting segments 30 may be determined on the printed image 20. In some examples, one reprinting segment 30 may include a plurality of damaged areas 22 on the printed image 20, i.e. the one reprinting segment 30 may be dimensioned to overlap the plurality of identified damaged areas 22. In some examples, a plurality of reprinting segments 30 may overlap one damaged area 22 on the printed image 20. In some examples, these reprinting segments 30 may have different sizes and shapes to overlap the damaged area 22 in a manner to minimize the overlap with non-damaged areas of the printed image 20.

The process of determining the reprinting segment 30 may comprise selecting the dimension and the shape of the reprinting segment 30. This may be done by reloading the printed image into the printer and then using image processing software. The dimension and shape of the reprinting segment 30 may be defined based on the identified damaged area 22 on the printed image 20 which has been reloaded or scanned in the printer. In some examples, the printer has a flatbed that facilitates reloading any printed image 20 for determining the reprinting segment 30 on the printed image 20.

In some examples, the reprinting segment 30 is determined by contour selection. Contour selection may be understood herein as the process of selecting a contour within the image content represented in an image data file, such as the printing template 10. As an example, a contour or contour line may be a curve along which a function describing the image content satisfies a certain criterion, such as assuming a constant value, or which may be determined by an image edge detection filter. The contour line may be visualized with a certain color value in the printing template 10. The contour line may be a closed curve, i.e. describing the image edge of an image object of the printing template 10 that has e.g. a single color value, and will be referred to as closed contour line. Hereinafter a closed contour line shall also refer to a contour line that is composed by an "open" contour line that only partly surrounds an image object located at the border area of the printing template 10 and by the section of the printing template 10 border that is part of this image object.

In some examples, determining the reprinting segment 30 by contour selection may include to automatically generate a contour image of the printed image 20 or the printing template 10. When determining the reprinting segment 30 on the printed image 20 based on the contour image either a printer operator may visually check or the printer may automatically determine within which of the closed contour lines the identified damaged area 22 of the printed image is located. Thus, the contour selection may include determining an area inside the closed contour lines within which the identified damaged area 22 on the printed image 20 is located. In some examples, the area inside the closed contour lines overlaps the identified damaged area 22.

In some examples, the reprinting segment 30 is determined by box selection, i.e., the reprinting segment 30 may have the shape of a box being dimensioned such as to overlap the identified damaged area 22. In some examples, the box may be rectangular or quadratic.

In some examples, the reprinting segment 30 is determined by band selection, i.e., the reprinting segment 30 may have the shape of a band that is dimensioned to cover at least the identified damaged area 22. The identified damaged area 22 may extend in the two main directions, i.e. in x- and y-direction. In some examples, the band's dimension is firstly limited to the extension of the damaged area with regard to one of the two main directions and, secondly, extends along the other main direction over the whole printing area. In other words, the band may extend in y-direction only as far as to overlap the damaged area's 22 widest extension in y-direction, and may extend in x-direction over the whole width of the substrate. In some examples, when the substrate is rectangular or quadratic in shape the band may extend orthogonal to the borders of the substrate extending in x-direction.

In some examples, the reprinting segment 30 may be formed to exactly match the identified damaged area 22. In some examples, the dimension of the reprinting segment 30 is a small fraction of the dimension of the printed image 20. Thus, the process of reprinting (as will be described below) at the reprinting segment 30 involves a fraction of the printing fluid compared to reprinting the whole printing template 10. Further, this may save costs especially when using rigid media which is the biggest contributor to the cost per copy.

Figure 4:
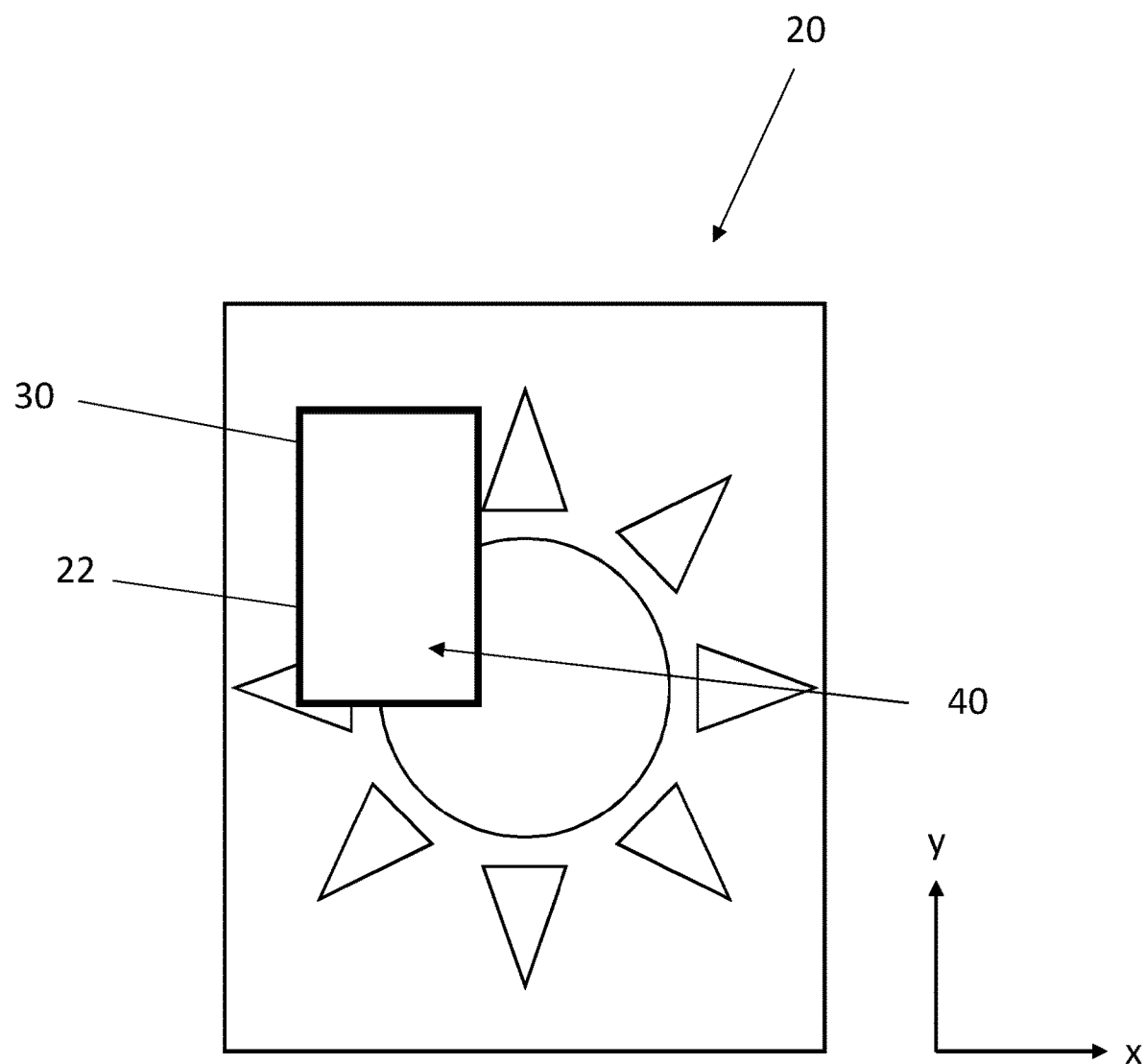
FIG. 4 is a schematic plan view of the example printed image including a layer of printing fluid over the damaged area.

Now referring to FIG. 4 which illustrates a schematic plan view of the example printed image 20 including a layer of printing fluid 40 over the damaged area 22. The layer of printing fluid 40 is printed over the damaged area 22 after the reprinting segment 30 is determined on the printed image 20. In some examples, the layer of printing fluid 40 is only printed at the reprinting segment 30. In some examples, the layer of printing fluid 40 is printed on top of the already printed area of the printed image 20 within the reprinting segment 30.

In some examples, the printing fluid is a white printing fluid. In some examples, the printing fluid can include any color and/or color mixture that is suitable to erase the damaged area 22 within the reprinting segment 30. Herein, the term "erase" is to be understood in a sense not to remove but rather to overprint the layer of original printing fluid of the printed image 20 at the reprinting segment 30 in order to provide a "fresh" printing surface which may be reprinted with the original image content without any loss in quality of the repaired image.

In some examples, the layer of printing fluid 40 may completely cover the printed image 20 at the reprinting segment 30. In some examples, printing the layer of printing fluid 40 may comprise to print only a reduced number of pixels of the reprinting segment 30. In some examples, when printing the layer of printing fluid 40 over the damaged area 22 of the printed image 20 at least every second pixel along the border of the reprinting segment 30 (or any other reduced number of pixels) is printed. This may have the effect that sharp image edges along the border are removed.

Thus, with regard to the reprinting segment 30 determined by contour selection, the area within the closed contour line is reprinted by the layer of printing fluid 40. Correspondingly, the reprinting segment 30 determined by box selection and band selection is reprinted by the layer of printing fluid 40.

Figure 5:
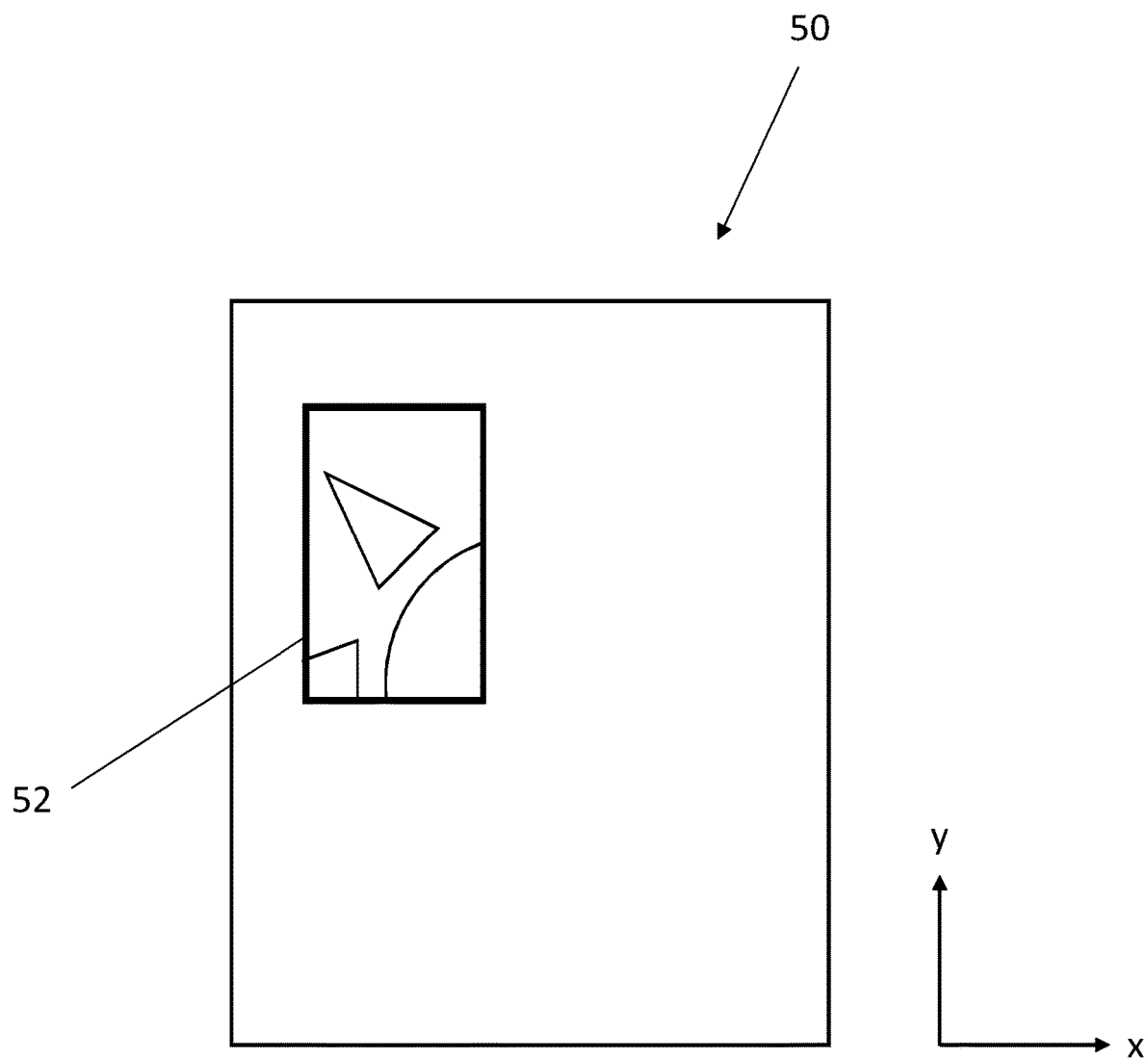
FIG. 5 is a schematic plan view of an example correction printing template including a segment of the printing template.

Now referring to FIG. 5 which illustrates a schematic plan view of an example correction printing template 50 including a segment 52 of the printing template 10. In some examples, the correction printing template 50 may be an image data file such as an image file, text file or a PDF-file including any text, graphics or other printable image data. Thus, FIG. 5 visualizes the image data content of the example correction printing template 50. Visualization of image data content may be done e.g. by a computer using an image viewing software. A printer including print software or a computer controlling a printer may be used to print the image data content of the correction printing template 50 on a substrate or media. Herein, the term "dimension" regarding the correction printing template 50 is to be understood as the printing size of the printing template 10 in x- and y-direction on the printing substrate.

In some examples, the correction printing template 50 is printed over the printed layer of printing fluid 40 at the reprinting segment 30. In some examples, the correction printing template 50 includes a segment 52 of the printing template 10 that corresponds to the reprinting segment 30 of the printed image 20. In some examples, the segment 52 is located on the correction printing template 50 exactly at the position of the reprinting segment 30 on the printed image 20. In some examples, the shape and dimension of the segment 52 are identical to the shape and dimension of the reprinting segment 30 on the printed image 20. Further, in some examples, the dimension of the correction printing template 50 is identical to the dimension of the printed image 20.

Figure 6:
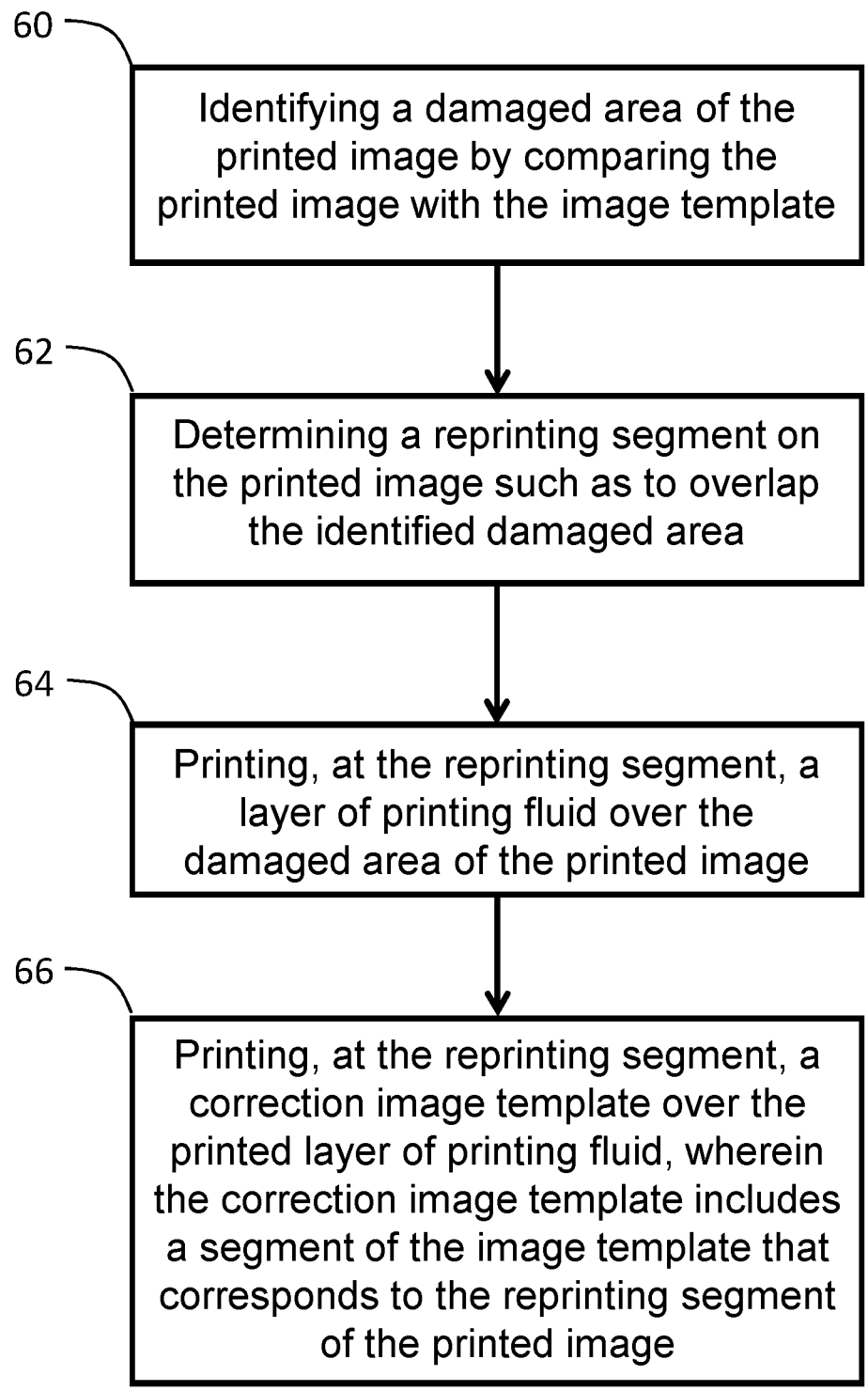
FIG. 6 is a block diagram of an example method for repairing a printed image according to an example.

Now referring to FIG. 6, which illustrates an example method for repairing a printed image 20 which has been printed by a printer based on a printing template 10. In some examples, the printer may use white printing fluid for repairing the printed image 20. In some examples, the printer is suitable to print on a rigid substrate which is placed on a print substrate support of the printer. In some examples, the substrate has a variety of sizes. In some examples, the printer may be an industrial printer printing on large substrates.

The example method includes identifying, in block 60, a damaged area 22 of the printed image 20 by comparing the printed image 20 with the printing template 10. In some examples, the printed image 20 may be reloaded in the printer before identifying the damaged area 22 of the printed image 22. In some examples, identifying may be done on a computer by using the printing template 10. In some examples, a printer operator may manually mark the area containing the defect by using e.g. a keyboard, a touchpad or the like such as provided on the printer.

In block 62, a reprinting segment 30 is determined on the printed image 20 such as to overlap the identified damaged area 22. In some examples, determining the reprinting segment 30 may be based on image editing software. In some examples, the dimension of the reprinting segment 30 is determined to be a fraction of the dimension of the printed image 20.

In block 64, a layer of printing fluid 40 is printed, at the reprinting segment 30, over the damaged area 22 of the printed image 20. In some examples, the printing fluid is a white printing fluid that is printed at the reprinting segment 30 by the printer.

In block 66, a correction printing template 50 is printed, at the reprinting segment 30, over the printed layer of printing fluid 40, wherein the correction printing template 50 includes a segment 52 of the printing template 10 that corresponds to the reprinting segment 30 of the printed image 20. In some examples, the shape and dimension of the segment 52 are identical to the shape and dimension of the reprinting segment 30 on the printed image 20. In some examples, the dimension of the segment 52 is a fraction of the dimension of the correction printing template 50. In some examples, the dimension of the reprinting segment 30 which is a fraction of the dimension of the printed image 20 is identical to the dimension of the segment 52.

In some examples, printing the layer of printing fluid 40 over the damaged area 22 of the printed image 20 may not be executed before the correction printing template 52 is created. In some examples, the layer of printing fluid 40 (block 64) and the correction printing template 50 (block 66) may be printed at the reprinting segment 30 during the same printing process. Here, the right layer order, i.e. the layer of printing fluid 40 should be arranged below the printed layer of the correction printing template 50, has to be ensured. In some examples, the carriage of the printer may be virtually split in two sections, i.e. one of the sections will print the layer of printing fluid 40 and the other section will print the correction printing template 50 on top of the layer of printing fluid 40.

Figure 7:
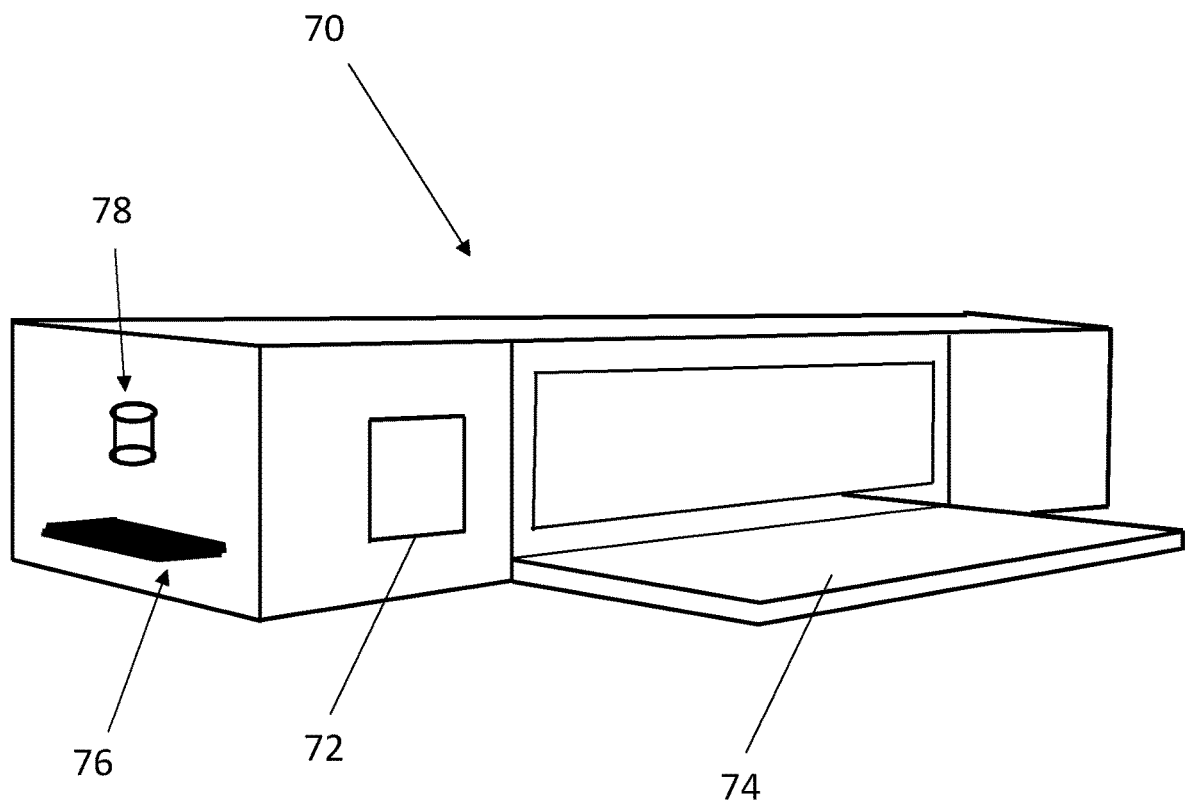
FIG. 7 is a side view of a schematic illustration of an example printer.

Now referring to FIG. 7 which is a side view of a schematic illustration of an example printer 70 comprising a processor 76 and a machine-readable storage medium 78. The processor 76 may perform a program being stored in the storage medium 78, wherein the program includes the method for repairing a printed image 20 which has been printed by the printer 70 based on a printing template, according to the method described in FIG. 6. In some examples, the processor 76 is to determine the reprinting segment 30 by at least one of contour selection, box selection, and band selection. In some examples, the processor 76 is to print the layer of printing fluid 40 and the correction printing template 50 during the same printing process. In some examples, the printer 70 may be controlled by a personal computer which also may include a processor and a storage. Communication between the personal computer and the printer 70 may be established through a network connection. In some examples, the printer 70 is an ink jet type printer. In some examples, the printer 70 may have a display 72 for controlling several printer functions by a user. The display 72 may be mounted at the printer housing in a user-friendly position. Further, the printer 70 includes a substrate support 74. In some examples, the substrate support 74 may advance the substrate past printer head continuously or incrementally.

Machine-readable storage medium 78 may be any electronic, magnetic, optical, or other physical storage device that stores executable instructions. Thus, machine-readable storage medium 78 may be, for example, Random Access Memory (RAM), an Electrically-Erasable Programmable Read-Only Memory (EEPROM), Flash Memory, a storage drive, an optical disc, and the like.

While several examples have been described in detail, it is to be understood that the disclosed examples may be modified. Therefore, the foregoing description is to be considered non-limiting.

What is claimed is:

1. A method for repairing a printed image after it has been printed by a printer based on a printing template, the method comprising:
    identifying a damaged area of the printed image by comparing the printed image with the printing template;
    determining a reprinting segment of the printed image, the reprinting segment to overlap the identified damaged area;
    printing, with the printer, a layer of printing fluid in the reprinting segment over the damaged area of the printed image; and
    printing, with the printer, a correction printing template over the layer of printing fluid, wherein the correction printing template includes a segment of the printing template that corresponds to the reprinting segment of the printed image.

2. The method according to claim 1, wherein the determining of the reprinting segment of the printed image includes determining the reprinting segment by contour selection.

3. The method of claim 2, wherein the contour selection includes:
    selecting a contour of the image within the printing template; and
    using the contour as a boundary of the reprinting segment.

4. The method according to claim 1, wherein the determining of the reprinting segment of the printed image includes determining the reprinting segment by box selection.

5. The method according to claim 1, wherein the determining of the reprinting segment of the printed image includes determining the reprinting segment by band selection.

6. The method according to claim 1, wherein the identifying of the damaged area of the printed image includes reloading the printed image into the printer and comparing the reloaded printed image and the printing template.

7. The method according to claim 1, further including determining a dimension of the reprinting segment on the printed image is to be a fraction of a dimension of the printed image.

8. The method according to claim 1, wherein printing of the correction printing templates include printing a shape and a dimension of the segment of the correction printing template identical to a shape and a dimension of the reprinting segment.

9. The method according to claim 1, further including printing the layer of printing fluid and the correction printing template during the same printing process.

10. The method according to claim 1, wherein the printing of the layer of printing fluid over the damaged area of the printed image includes printing the layer of printing fluid with only a reduced number of pixels along a border of the reprinting segment.

11. The method according to claim 1, wherein the printing fluid is a white printing fluid.

12. The method according to claim 1, wherein the printed image is printed on a rigid medium.

13. A printer, comprising:
    a print head; and
    a processor to:
        identify a damaged area of a printed image by comparing the printed image with a printing template;
        determine a reprinting segment to overlap the identified damaged area;
        cause the print head to print a layer of printing fluid over the damaged area of the printed image; and
        cause the print head to print a correction printing template over the layer of printing fluid, the correction printing template including a segment of the printing template that corresponds to the reprinting segment of the printed image.

14. The printer of claim 13, wherein the processor is to determine the reprinting segment by at least one of contour selection, box selection, and/or band selection.

15. The printer of claim 13, wherein the processor is to cause the print head to print the layer of printing fluid and the correction printing template during the same printing process.

16. A non-transitory computer readable storage medium comprising instructions, which when executed, cause one or more processors to at least:
    identify a damaged area of a printed image by comparing the printed image with a printing template;
    determine a reprinting segment of the printed image, the reprinting segment to overlap the identified damaged area;
    cause a print head to print a layer of printing fluid over the damaged area of the printed image; and
    cause the print head to print a correction printing template over the layer of printing fluid, the correction printing template including a segment of the printing template that corresponds to the reprinting segment of the printed image.

* * * * *